United States Patent
Lachenmaier

(10) Patent No.: US 10,589,936 B2
(45) Date of Patent: Mar. 17, 2020

(54) CONTINUOUS CONVEYOR FOR TRANSPORTING HEAVY BULK MATERIALS OR UNIT LOADS

(71) Applicant: Caterpillar Global Mining Europe GmbH, Lünen (DE)

(72) Inventor: Sepp Lachenmaier, Remich (LU)

(73) Assignee: Caterpillar Global Mining Europe GmbH, Lunen (DE)

( * ) Notice: Subject to any disclaimer, the term of this patent is extended or adjusted under 35 U.S.C. 154(b) by 0 days.

(21) Appl. No.: 15/285,580

(22) Filed: Oct. 5, 2016

(65) Prior Publication Data

US 2017/0022013 A1 Jan. 26, 2017

Related U.S. Application Data

(63) Continuation of application No. 14/175,326, filed on Feb. 7, 2014, now Pat. No. 9,527,670.

(51) Int. Cl.
*H02K 1/27* (2006.01)
*H02K 7/10* (2006.01)
(Continued)

(52) U.S. Cl.
CPC ............ *B65G 23/24* (2013.01); *B65G 15/30* (2013.01); *B65G 23/00* (2013.01); *B65G 23/22* (2013.01);
(Continued)

(58) Field of Classification Search
CPC ....... H02K 7/1004; H02K 7/116; H02K 19/02
(Continued)

(56) References Cited

U.S. PATENT DOCUMENTS 2,728,445 A * 12/1955 Erickson ................ B65G 23/00
198/835
2,728,455 A 12/1955 Greiner
(Continued)

FOREIGN PATENT DOCUMENTS

CN 201254382 Y 6/2009
CN 201280334 Y 7/2009
(Continued)

OTHER PUBLICATIONS

GmbH Thyssenkrupp Fordertechnik "Gearless Conveyor Drives," Aug. 31, 2011, XP055348957, URL:http://thyssenkrupprobins.com/Publications/Brochures/pdf.files/1028-Gearles Drive_brochure.pdf.
(Continued)

*Primary Examiner* — John K Kim

(57) ABSTRACT

A continuous conveyor such as, for example, a conveyor belt for transporting heavy bulk materials or unit loads comprises an endless tractive transport mechanism that revolves between a driving roller and a return roller. The driving roller is driven by a permanently excited multi-pole synchronous motor that delivers a very high torque at a comparatively slow nominal speed. The synchronous motor can drive the driving roller directly or alternatively via a single-stage step-down gear with low reduction factor. The drive is characterized by a mass moment of inertia that is up to 10-times lower than in conventional drive systems. In this way, the risk of damaging or even tearing the belt during disruptions is substantially reduced such that the operational reliability significantly increases.

20 Claims, 4 Drawing Sheets

(51) Int. Cl.
*H02K 7/116* (2006.01)
*H02K 19/02* (2006.01)
*B65G 23/24* (2006.01)
*B65G 23/00* (2006.01)
*B65G 23/22* (2006.01)
*B65G 15/30* (2006.01)
*B65G 39/12* (2006.01)

(52) U.S. Cl.
CPC ............ *B65G 39/12* (2013.01); *H02K 7/1004* (2013.01); *H02K 7/116* (2013.01); *H02K 19/02* (2013.01)

(58) Field of Classification Search
USPC ..................................... 310/68 R, 83, 156.01
See application file for complete search history.

(56) References Cited

U.S. PATENT DOCUMENTS

| | | | |
|---|---|---|---|
| 3,968,390 A | 7/1976 | Yasuda et al. | |
| 4,463,841 A * | 8/1984 | Kelley | F16D 67/04 192/18 A |
| 4,530,174 A | 7/1985 | Hurt et al. | |
| 5,239,881 A | 8/1993 | Chiba et al. | |
| 5,422,525 A * | 6/1995 | Mansir | G01B 7/14 310/179 |
| 5,677,587 A * | 10/1997 | Sakashita | H02K 1/2786 310/154.28 |
| 5,917,259 A * | 6/1999 | Stridsberg | H02K 7/003 310/75 A |
| 7,681,843 B2 | 3/2010 | McQueeny | |
| 2005/0109584 A1* | 5/2005 | Hayashi | B65G 23/08 198/780 |
| 2005/0211490 A1* | 9/2005 | Shimizu | B60K 1/00 180/243 |
| 2007/0194650 A1* | 8/2007 | Ito | H02K 3/28 310/179 |
| 2007/0249457 A1* | 10/2007 | Tesar | F16H 1/28 475/180 |
| 2008/0095599 A1 | 4/2008 | Hahn | |
| 2010/0171383 A1* | 7/2010 | Petrov | H02K 1/02 310/156.28 |
| 2011/0084636 A1* | 4/2011 | Kyllingstad | H02P 6/10 318/400.23 |
| 2012/0104892 A1* | 5/2012 | Kamei | H02K 1/276 310/156.53 |
| 2012/0212167 A1* | 8/2012 | Wu | H02P 6/14 318/400.13 |
| 2013/0056694 A1* | 3/2013 | Wilkins | B66D 1/225 254/342 |
| 2013/0106208 A1* | 5/2013 | Yamada | H02K 1/2706 310/43 |
| 2013/0306443 A1 | 11/2013 | Rathmann et al. | |
| 2013/0307357 A1* | 11/2013 | Maksumic | H02K 5/20 310/54 |
| 2014/0191624 A1* | 7/2014 | Jahshan | H02K 35/02 310/68 B |
| 2014/0197767 A1* | 7/2014 | Liu | F04C 14/08 318/400.38 |
| 2014/0284183 A1* | 9/2014 | Wolters | B65G 23/08 198/788 |
| 2014/0291126 A1* | 10/2014 | Becker | B65G 15/28 198/835 |
| 2016/0202296 A1* | 7/2016 | Costanzo | G01R 19/175 324/649 |
| 2017/0022013 A1* | 1/2017 | Lachenmaier | B65G 23/00 |

FOREIGN PATENT DOCUMENTS

| | | |
|---|---|---|
| CN | 101713473 | 5/2010 |
| DE | 102004055296 A1 | 6/2005 |
| EP | 2562102 | 2/2013 |
| FR | 2944164 | 10/2010 |
| JP | 2005176588 A | 6/2005 |
| WO | 03008307 A1 | 1/2003 |

OTHER PUBLICATIONS

Siemens "Press Presse Press Presse Industry Sector Industry Solutions Division", Dec. 10, 2010, XP 055359212, URL: http://www.siemens.com/press/pool/de/pressemitteilungen/2010/industry_solutions/iiS201012700e.pdf.

Advanced Drive System Saves up to 20% Energy, Aug. 22, 2011 (pp. 1-12) XP055076615.

Chinese Office Action for related Chinese Application No. 201280039108.0; report dated Feb. 25, 2015.

* cited by examiner

CONTINUOUS CONVEYOR FOR TRANSPORTING HEAVY BULK MATERIALS OR UNIT LOADS

CROSS-REFERENCE TO RELATED APPLICATIONS

This application is a continuation of U.S. patent application Ser. No. 14/175,326 filed on Feb. 7, 2014, which is a continuation of International Application PCT/EP2012/058117 filed on May 3, 2012, which claims priority to European Patent Application Serial No. EP 11 177 042.6 filed Aug. 10, 2011.

BACKGROUND

The invention pertains to continuous conveyors that are used for transporting large quantities of bulk materials such as sand, stones or ore, as well as for transporting heavy unit loads, for example, in the mining industry such as in open pit mining or deep mining or in the loading and unloading of ships, silos, etc. In this case, the bulk materials or unit loads are loaded onto the tractive transport means in a loading station and transported to an unloading or transfer station.

One typical example of a continuous conveyor is a conveyor belt for carrying off crushed ore. The conveyor belt runs on idlers that are supported in an elongated support construction of steel profiles. In addition to one or more driveshafts, the driving station comprises at least one electric motor that is usually realized in the form of an asynchronous motor and operates with a relatively high speed, e.g., of 1500 rpm. The driving roller that drives the conveyor belt, in contrast, revolves with a relatively slow speed between 5 and 100 rpm. Consequently, a step-down gear needs to be provided between the asynchronous motor and the driving roller, wherein said step-down gear is typically realized in the form of a multi-stage cylindrical gearing or epicyclic gearing and has a reduction ratio between 15:1 and 150:1. Gears with variable transmission ratio are also used in order to adjust the operating speed of the driving roller. The driving motor and, if applicable, the step-down gear may be integrated into the driving roller and realized in the form of a so-called drum motor. The continuous conveyor may also comprise several driving stations such as, e.g., two head stations and one or more intermediate stations, wherein each driving station features one or two electric motors and a corresponding number of driving rollers.

Disruptions during the transport are transmitted in the form of impact loads to the output shaft of the gear via the driving roller and ultimately into the driving motor. Considerable disruptions that are caused, for example, by a backup of bulk material or jamming objects may even lead to the tractive transport means suddenly coming to a brief standstill. However, the rotor of the motor, shafts and toothed wheels of the gear, as well as the driving roller coupled thereto, continue to move due to the significant mass inertia of the overall drive system at least until the motor is automatically shut off or decoupled once certain forces are exceeded. This can lead to considerable mechanical tensions in the gear, the motor and the tractive transport means that result in damages, e.g., tearing, of the tractive transport means. In order to prevent such impermissibly high impact loads and potential damages of the tractive transport means, an overload clutch is frequently installed between the driving roller and the step-down gear in the prior art, wherein this overload clutch automatically engages, i.e. separates the electric drive from the driving roller, when predefined loads above the normal operating loads are exceeded.

Particularly in large and very large continuous conveyors of the type used in the mining industry or in open pit mining, the costs and the expenditure of time required for repairing a torn tractive transport means are so high that this type of damage must be prevented under all circumstances. This results in a correspondingly high constructive effort for the overload clutch and the monitoring and control systems that trigger an emergency shut-off in a timely fashion.

SUMMARY

The present invention provides a continuous conveyor, particularly for heavy bulk materials or unit loads, that is less sensitive to disruptions during the transport, and the risk of overloading and damaging the tractive transport means due to such disruptions is reduced.

These teachings are based on the realization that the significant mass inertia of conventional drive systems is responsible for the tractive transport means being quickly subjected to a mechanical overload in case of a disruption and that the reduction of the mass inertia of the drive system therefore needs to be the target of development.

According to one embodiment, a permanently excited multi-pole synchronous motor, the speed of which is no more than 15-times as fast as the operating speed of the driveshaft, is utilized instead of a high-speed electric motor with a multi-stage step-down gear flanged thereto, wherein said synchronous motor delivers a torque of at least 30 kNm. Such a slowly revolving electric motor with high torque eliminates the need for an elaborate multi-stage step-down gear. In this way, the mass moment of inertia of the drive acting upon the driving roller is reduced to less than 20% of the mass moment of inertia of a conventional drive. Due to the significantly slower motor speed, the kinetic energy of the drive system is much lower. The relatively light drive unit reacts faster in case of a disruption during the transport of the bulk material or unit load. During an externally controlled deceleration or even a brief standstill of the tractive transport means, the motive force of the motor can be reduced or shut off before impermissibly high forces are introduced into the tractive means via the driving roller. In case of a malfunction such as, e.g., a short-circuit in the converter or motor, the occurring moment of impact is much lower such that the load on the mechanical components is significantly reduced. A deformation or even tearing of the tractive transport means therefore is practically precluded and an overload clutch can be eliminated.

According to a consequent and advantageous enhancement of the inventive notion of minimizing the mass moment of inertia of the drive, the electric motor may directly drive the driving roller of the tractive transport means. In such a high-torque rotative direct drive that is also referred to as a torque motor, the motor speed corresponds to the operating speed of the driveshaft. In this way, a step-down gear becomes completely unnecessary and the mass moment of inertia of the drive is reduced to a minimum. Compared to a conventional drive with a high-speed asynchronous motor and an intermediate step-down gear, the mass moment of inertia of such a direct drive can be reduced by a factor of 10.

The efficiency of a drive system with torque motor is approximately 5% higher. This means that the energy consumption is lowered and the cooling capacity is reduced. Torque motors do not require rotor cooling.

The synchronous motors with a large number of pole pairs used in this case consist, in principle, of large servomotors with a hollow shaft that are optimized for high torques. Until now, rotative direct drives or torque motors were primarily utilized in production machines such as, e.g., laser cutting machines, milling and grinding machines or extruders, but not in heavy conveying machines.

The nominal revolution speed of the synchronous motor preferably lies between 5 and 100 revolutions per minute, particularly between 20 rpm and 50 rpm, if the motor directly drives the driveshaft. The delivered torque preferably lies between 50 and 800 kilonewtonmeter, particularly between 100 kNm and 500 kNm. Only low-speed synchronous motors with such a high torque make it possible to directly drive the tractive transport means. The power output of the drive preferably lies between 50 and 2000 kilowatt, particularly between 100 kW and 1000 kW.

If the synchronous motor drives the driveshaft via a single-stage step-down gear, the preferred nominal speed is preferably higher by a factor of 2 to 10 depending on the reduction ratio and the torque delivered by the motor preferably is only about half as high. In this case, the mass moment of inertia is also significantly reduced by at least a factor of 5 in comparison to conventional drives. Compared to conventional drives with multiple gear stages, the drive with a synchronous motor and a single-stage step-down gear has significantly fewer moving parts. This means that the system reliability is improved. A torque motor with a single-stage gear results in a much more compact drive.

Multi-pole synchronous motors or rotative direct drives respectively can be quickly and precisely controlled by means of frequency converters. Compared to conventional solutions without speed control, the utilization of frequency converters makes it possible to realize significant system advantages. These include the monitoring and limiting of the speed and the torque of the synchronous motor and of the performance data of the conveying process, as well as the corresponding documentation of the actually conveyed loads (condition monitoring). The speed control of the tractive transport means makes it possible to stabilize the loading process and therefore to achieve a consistent and gentle operation of the continuous conveyor.

The motors used for the inventive continuous conveyor preferably are motors that deliver the required motor speed at a motor frequency between 5 and 150 Hz, preferably in the range between 50 Hz and 100 Hz, depending on the number of their pole pairs. The number of pole pairs preferably lies between 6 and 50, particularly around 10.

BRIEF DESCRIPTION OF THE DRAWINGS

Further details and advantages of this disclosure are explained using embodiments, with reference to the attached drawings. Components that are identical and correspond to one another are labelled therein using matching reference numerals. In the drawings.

DETAILED DESCRIPTION OF THE DISCLOSURE

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
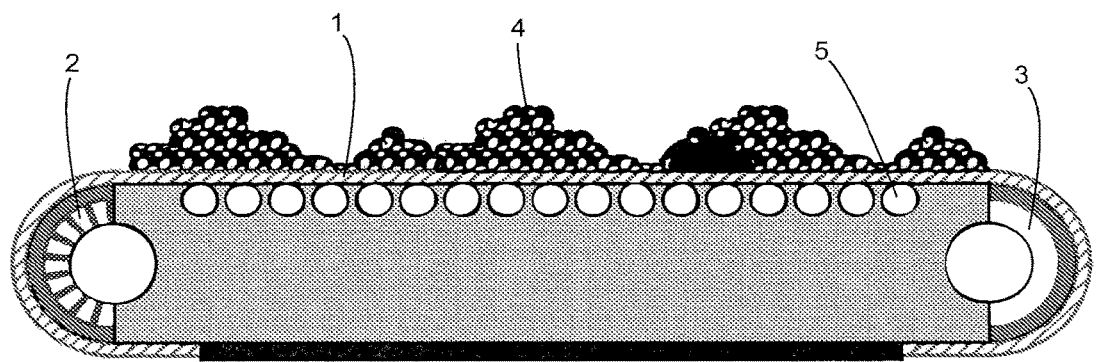
FIG. 1 shows a schematic horizontal section through a conveyor belt for heavy bulk materials.

FIG. 1 schematically shows an example of a continuous conveyor in the form of a conveyor belt. Its endless belt 1 revolves between a driving roller 2 and a return roller 3. The heavy bulk material 4 such as, e.g., ore or crushed rock is loaded onto the section of the belt 1 that currently forms the carrying run and essentially transported horizontally from the left toward the right in the drawing. Idlers 5 for supporting the weight of the belt 1 and the bulk material 4 are arranged underneath the belt 1.

Figure 2:
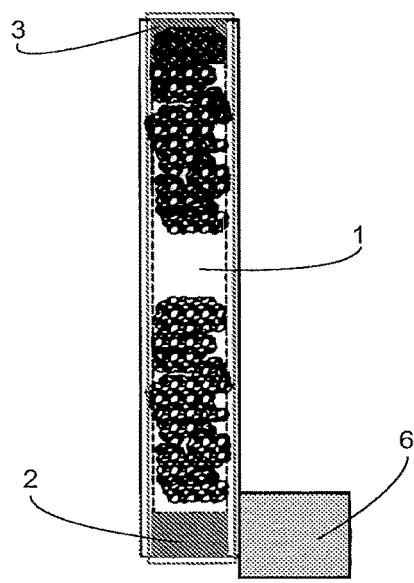
FIG. 2 shows a schematic top view of the conveyor belt in FIG. 1.

The conveyor belt is driven by a low-speed, multi-pole synchronous motor 6 with high torque. According to FIG. 2, the synchronous motor 6 drives the driving roller 2 of the conveyor belt directly, i.e., without an intermediate mechanical gear. The operating speed of the driving roller 2 amounts to approximately 40 revolutions per minute such that the synchronous motor 6 also has a nominal speed of 40 rpm. In this case, the synchronous motor 6 delivers a torque around 300 kilonewtonmeter.

At a higher power demand, a second synchronous motor of the same type can be coupled to the driving roller 2. If the structural length of the synchronous motor 6 is limited due to lack of space, a single-stage step-down gear that reduces the speed of the synchronous motor 6, for example, by a factor of 5 may also be provided between the driving roller 2 and the synchronous motor 6.

Figure 3:
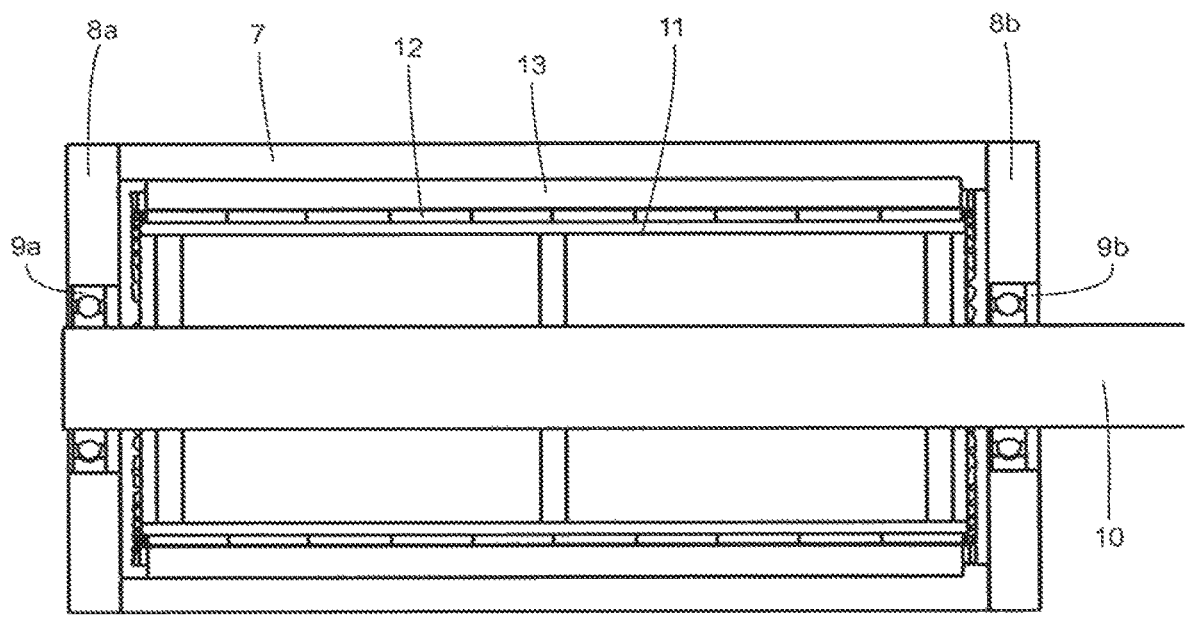
FIG. 3 shows a longitudinal section through the electric motor of the conveyor belt according to FIG. 2.
Figure 4:
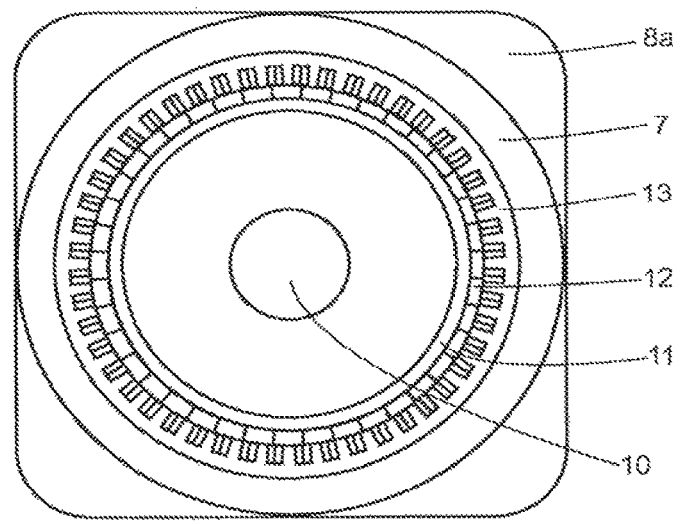
FIG. 4 shows a cross section through the electric motor in FIG. 3.

According to the sectional representations in FIG. 3 and FIG. 4, the synchronous motor 6 is approximately twice as long as it is wide. The modularly designed synchronous motor 6 is realized in the form of a segmental construction and features a casing 7 that extends between two end plates 8a and 8b on the faces. The bearings 9a, 9b for the rotor shaft 10, on which the rotor 11 is seated, are situated in the end plates 8a, 8b. On its periphery, the rotor 11 carries a plurality of magnetic poles 12. The stator 13 is seated in the casing 7 such that it is separated from the rotor 11 by a small air gap. This motor therefore consists of a motor with internal rotor. The rotor shaft 10 protruding from the end plate 8b on one (the right) side is coupled to the driving roller 2 of the conveyor belt (see FIG. 2).

Figure 5:
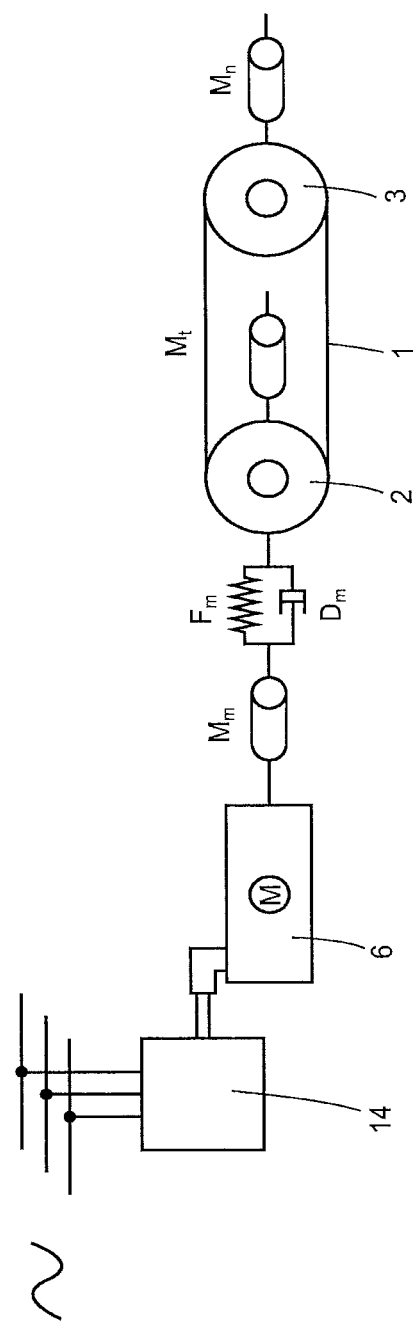
FIG. 5 shows a block diagram of a continuous conveyor with rotative direct drive.

The block diagram in FIG. 5 elucidates the advantages associated with the direct drive of the belt 1 by means of a permanently excited multi-pole synchronous motor with high torque.

An electronic frequency converter 14 is connected to the 3-phase A.C. network and generates an alternating voltage of variable amplitude and frequency that is applied to the stator of the synchronous motor 6. The revolving alternating field drives the rotor. The speed of the synchronous motor 6 can be varied between zero and the nominal speed by driving the frequency converter 14 accordingly such that the conveyor belt can be started from a standstill with a high torque without requiring an intermediate clutch between the driving roller 2 and the synchronous motor 6. The overall mass moment of inertia of the drive is correspondingly low and essentially composed of the mass moment of inertia $M_m$ of the synchronous motor 6, the mass moment of inertia $M_t$ of the belt 1 together with the driving roller 2 and the mass moment of inertia $M_u$ of the return roller 3. Since the synchronous motor 6 directly drives the driving roller 2 and therefore is operated with a relatively slow speed, the mass moment of inertia $M_m$ of the complete drive system is significantly lower than in conventional drives with a high-speed asynchronous motor, a multi-stage gear and an overload clutch. The transformed mass moment of inertia of the inventive drive system is approximately 10-times lower than in conventional drives.

The elasticity and damping properties of the drivetrain are also far superior. The drive system basically comprises only the synchronous motor 6 and the driving roller 2 and is capable of carrying out torsional vibrations in the axial direction, as well as in the radial direction, due to the mechanical elasticities. In this case, the spring stiffness $F_m$ of the motor elasticities comprises the torsional spring stiffness of the motor shaft of the synchronous motor 6, as well as the axial spring stiffness. The frictional damping in the bearings, as well as the damping in the air gap due to magnetic reversal, are characterized by the damping $D_m$. The spring stiffness $F_m$ can practically be neglected if the synchronous motor 6 is directly coupled to the driving roller 2.

Figure 6:
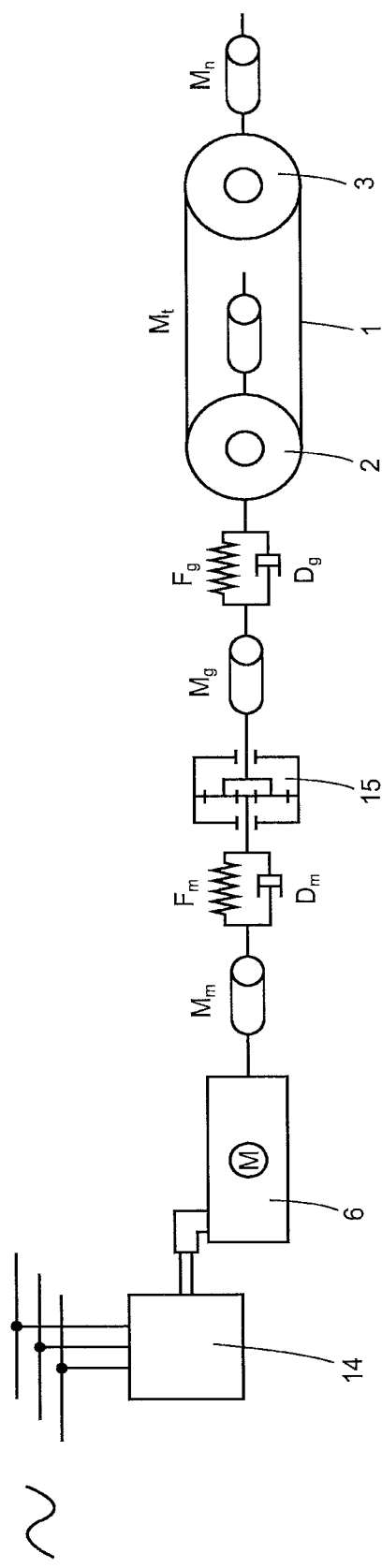
FIG. 6 shows a block diagram of a continuous conveyor with a low-speed synchronous motor and a step-down gear.

The drive system for the belt 1 illustrated in FIG. 6 can only be distinguished from the drive according to FIG. 5 by the intermediate arrangement of a single-stage step-down gear 15 between the synchronous motor 6 and the driving roller 2 of the belt 1. In this variation, the synchronous motor 6 no longer necessarily rotates with the same speed as the driving roller 2. This makes it possible to realize a synchronous motor 6 with a smaller structural size, but with a slightly higher nominal speed. However, it suffices to provide a small single-stage step-down gear 15 because the speed only needs to be reduced by no more than a factor of 15. The step-down gear 15 therefore can be realized correspondingly simple, small and light.

Although the additional mass moment of inertia $M_g$ of the step-down gear 15 causes a twofold to threefold increase of the overall inert mass of the drive, this inert mass is still five-times to ten-times smaller than in conventional drives.

The elasticity and damping properties of the drivetrain likewise only deteriorate little due to the relatively small step-down gear. The motor spring stiffness $F_m$ is increased by the additional spring stiffness $F_g$ of the gear elasticities. These include the respective torsional spring stiffness of the gear shafts and of the shaft-hub connections in the gear, the tooth stiffness due to elastic tooth deformation, as well as the radial spring stiffness and the axial spring stiffness of the shaft-hub connections, shafts, bearings and tooth engagements within the gear. With respect to the damping constant $D_m$ of the synchronous motor 6, the damping constant $D_g$ of the gear damping that results from the frictional damping in the bearings in the gear, the degree of damping of the toothed wheel pairings due to torsion, the frictional damping in the toothed wheel pairings, as well as the frictional damping in the oil bath, must be taken into consideration. Even with consideration of the spring stiffness $F_g$ and the gear damping $D_g$ of the step-down gear 15, the overall elasticity and damping properties of the entire drivetrain are still far superior to those of conventional drive systems.

While exemplary embodiments have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE SYMBOLS

1 Belt
2 Driving roller
3 Return roller
4 Bulk material
5 Idlers
6 Synchronous motor
7 Casing
8a, 8b End plates
9a, 9b Bearings
10 Rotor shaft
11 Rotor
12 Magnetic poles
13 Stator
14 Frequency converter
15 Step-down gear

What is claimed is:

1. An electromotive drive, comprising:
   at least one permanently excited multi-pole synchronous motor having a range of 6 and 50 pole pairs, a rotor shaft upon which a rotor is seated, the rotor shaft supported by respective bearings at opposing end plates of the motor, the rotor shaft configured to couple with a driving roller via a single-stage step-down gear, the driving roller configured to drive a continuous conveyor belt, a casing extending between the opposing endplates upon which a stator is seated, and wherein the pole pairs are arranged on a periphery of the rotor.

2. The electromotive drive according to claim 1, wherein the synchronous motor has between 8 and 15 pole pairs.

3. The electromotive drive according to claim 1, wherein the nominal speed of the synchronous motor is between 6 rpm and 700 rpm.

4. The electromotive drive according to claim 1, wherein the synchronous motor delivers a torque between 30 kNm and 800 kNm.

5. The electromotive drive according to claim 1, wherein the synchronous motor has a power output between 50 kW and 2000 kW.

6. The electromotive drive according to claim 1, wherein the motor frequency of the synchronous motor is between 5 Hz and 150 Hz.

7. An electromotive drive, comprising:
   at least one permanently excited multi-pole synchronous motor having a range of 6 and 50 pole pairs, a rotor shaft upon which a rotor is seated, the rotor shaft supported by respective bearings at opposing end plates of the motor, the rotor shaft configured to protrude beyond one endplate to couple with a driving roller via a single-stage step-down gear, the driving roller configured to drive a continuous conveyor belt, a casing extending between the opposing endplates, and wherein the pole pairs are arranged on a periphery of the rotor.

8. The electromotive drive according to claim 7, wherein the nominal speed of the synchronous motor is between 6 rpm and 50 rpm.

9. The electromotive drive according to claim 7, wherein the nominal speed of the synchronous motor is between 20 rpm and 50 rpm.

10. The electromotive drive according to claim 7, wherein the synchronous motor delivers a torque between 50 kNm and 800 kNm.

11. The electromotive drive according to claim 7, wherein the synchronous motor delivers a torque between 100 kNm and 500 kNm.

12. The electromotive drive according to claim 7, wherein the synchronous motor has a power output between 50 kW and 2000 kW.

13. The electromotive drive according to claim 7, wherein the synchronous motor has a power output between 100 kW and 1000 kW.

14. The electromotive drive according to claim 7, wherein the motor frequency of the synchronous motor is between 50 Hz and 150 Hz.

15. An electromotive drive, comprising:
at least one permanently excited multi-pole synchronous motor having a range of 6 and 50 pole pairs, a rotor shaft upon which a rotor is seated, the rotor shaft supported by respective bearings at opposing end plates of the motor, the rotor shaft configured to indirectly couple with a driving roller via a single-stage step-down gear having a reduction ratio in the range between 2 and 15, the driving roller configured to drive a continuous conveyor belt, a casing extending between the opposing endplates, and wherein the pole pairs are arranged on a periphery of the rotor.

16. The electromotive drive according to claim 15, wherein the nominal speed of the synchronous motor is between 10 rpm and 700 rpm.

17. The electromotive drive according to claim 15, wherein the nominal speed of the synchronous motor is between 50 rpm and 300 rpm.

18. The electromotive drive according to claim 15, wherein the synchronous motor delivers a torque between 30 kNm and 400 kNm.

19. The electromotive drive according to claim 15, wherein the synchronous motor delivers a torque between 50 kNm and 250 kNm.

20. The electromotive drive according to claim 15, wherein the synchronous motor has a power output between 50 kW and 2000 kW.

* * * * *